United States Patent
Subrahmanyam et al.

(10) Patent No.: US 11,939,223 B2
(45) Date of Patent: Mar. 26, 2024

(54) PROCESS FOR THE HYDROPHOBIZATION OF POROUS SILICA

(71) Applicant: aerogel-it GmbH, Osnabrueck (DE)

(72) Inventors: Raman Subrahmanyam, Hamburg (DE); Fynn Missfeldt, Hamburg (DE); Pavel Gurikov, Hamburg (DE); Irina Smirnova, Hamburg (DE); Sohajl Movahhed, Cologne (DE); Wibke Loelsberg, Ludwigshafen am Rhein (DE); Paul Dieringer, Frankfurt am Main (DE)

(73) Assignee: aerogel-it GmbH, Osnabrueck (DE)

( * ) Notice: Subject to any disclaimer, the term of this patent is extended or adjusted under 35 U.S.C. 154(b) by 206 days.

(21) Appl. No.: 17/442,406

(22) PCT Filed: Mar. 24, 2020

(86) PCT No.: PCT/EP2020/058163
§ 371 (c)(1),
(2) Date: Sep. 23, 2021

(87) PCT Pub. No.: WO2020/193554
PCT Pub. Date: Oct. 1, 2020

(65) Prior Publication Data
US 2022/0185682 A1 Jun. 16, 2022

(30) Foreign Application Priority Data
Mar. 25, 2019 (EP) ...................... 19164913

(51) Int. Cl.
| | | |
|---|---|---|
| *C01B 33/158* | (2006.01) | |
| *B01J 13/00* | (2006.01) | |
| *B01J 20/10* | (2006.01) | |
| *C04B 14/06* | (2006.01) | |

(52) U.S. Cl.
CPC ....... *C01B 33/1585* (2013.01); *B01J 13/0091* (2013.01); *B01J 20/103* (2013.01); *C04B 14/062* (2013.01)

(58) Field of Classification Search
CPC . C01B 33/1585; B01J 13/0091; B01J 20/103; B01J 13/0095; B01J 20/28047; B01J 20/3204; B01J 20/3257; C04B 14/062; C04B 2111/28; C04B 20/1051; C04B 28/02; C04B 14/041; C04B 14/043; C04B 14/064
See application file for complete search history.

(56) References Cited

U.S. PATENT DOCUMENTS

| | | |
|---|---|---|
| 2001/0034375 A1 | 10/2001 | Schwertfeger et al. |
| 2018/0105429 A1 | 4/2018 | Jantke et al. |
| 2018/0134565 A1 | 5/2018 | Hindelang et al. |

FOREIGN PATENT DOCUMENTS

| | | | |
|---|---|---|---|
| CA | 3024899 | 11/2017 | |
| EP | 1048696 | 11/2000 | |
| EP | 2957340 | 12/2015 | |
| WO | 00/24799 | 5/2000 | |
| WO | 2012/041823 | 4/2012 | |
| WO | WO-2013053951 A1 * | 4/2013 | ........... C04B 28/005 |

* cited by examiner

*Primary Examiner* — Colin W. Slifka
*Assistant Examiner* — Logan Edward Laclair
(74) *Attorney, Agent, or Firm* — Grüneberg and Myers PLLC

(57) ABSTRACT

A process for the hydrophobization of a porous silica based compound involves the steps of providing a composition (I) containing a porous silica based compound, treating the composition (I) with a composition (II) containing hexamethyldisiloxane or its hydrolyzed form, and removing the treated silica based compound. The porous silica based compound obtained by the process is useful. A porous silica based compound obtained or obtainable by the process can be used for medical and pharmaceutical applications, as adsorbents, for cosmetic applications, as an additive for food, as a catalyst support, for the preparation of sensors, or for thermal insulation.

10 Claims, No Drawings

PROCESS FOR THE HYDROPHOBIZATION OF POROUS SILICA

CROSS-REFERENCE TO RELATED APPLICATIONS

This application is the National Stage entry under § 371 of International Application No. PCT/EP2020/058163, filed on Mar. 24, 2020, and which claims the benefit of priority to European Application No. 19164913.6, filed on Mar. 25, 2019. The content of each of these applications is hereby incorporated by reference in its entirety.

BACKGROUND OF THE INVENTION

Field of the Invention

The present invention is directed to a process for the hydrophobization of a porous silica based compound, the process comprising the steps of providing a composition (I) comprising a porous silica based compound, treating the composition (I) with a composition (II) comprising hexamethyldisiloxane or its hydrolyzed form, and removing the treated silica based compound. The present invention further is directed to the porous silica based compound obtained by the process as such as well as the use of the porous silica based compound according to the present invention or a porous silica based compound obtained or obtainable by a process according to the present invention for medical and pharmaceutical applications, as adsorbents, for cosmetic applications, as additive for food, as catalyst support, for the preparation of sensors, or for thermal insulation.

Description of Related Art

Porous silica based materials are suitable for various applications. Porous materials having pores in the size range of a few microns or significantly below and a high porosity of at least 70% are for example particularly good thermal insulators on the basis of theoretical considerations.

Silica based aerogels and xerogels as well as processes for their preparation are known from the state of the art. Such porous materials having a small average pore diameter can be, for example, in the form of aerogels or xerogels which are produced with a sol-gel process and subsequent drying. In the sol-gel process, a sol based on a reactive gel precursor is first produced and the sol is then gelled by means of a crosslinking reaction to form a gel. To obtain a porous material, for example an aerogel, from the gel, the liquid has to be removed. This step will hereinafter be referred to as drying in the interests of simplicity.

For several applications, a hydrophobization of the aerogels is necessary. Liquid phase silylation is usually the preferred method for hydrophobization in the aerogel production processes. The most common silylating agents used are TMCS and HMDZ which create side streams such as hydrochloric acid and ammonia that are detrimental to human health and require special disposal thus resulting in higher fixed and operating costs. A further hydrophobization agent is HMDSO. However, in most cases of aerogel production, the solvent cannot be recycled leading to higher raw material costs. In aerogel production, liquid phase hydrophobization is a process bottleneck as it usually takes 4-6 h.

Alternatively, the aerogel can be prepared without using a hydrophobizing agent and the resulting material can be hydrophobized in the gas phase. Generally, the aerogel is pressurized at low pressure with one or more organosilanes in form of a vapor in a suitable gas chamber as for example disclosed in WO 2012/041823 A1. The hydrophobization in the gas phase requires an additional process step which increases the costs of the overall process.

SUMMARY OF THE INVENTION

It was therefore an object of the present invention to provide a process for the hydrophobization of porous silica based compounds which avoids these disadvantages.

According to the present invention, this object is achieved by a process for the hydrophobization of a porous silica based compound, the process comprising the steps
(i) providing a composition (I) comprising a porous silica based compound,
(ii) treating the composition (I) with a composition (II) comprising hexamethyldisiloxane or its hydrolyzed form,
(iii) removing the treated silica based compound.

According to the present invention it is possible to use a hydrophobizing agent in the preparation process to modify the properties of the porous silica based compound, for example an aerogel.

DETAILED DESCRIPTION OF THE INVENTION

It has been surprisingly found that the process according to the present invention allows for a hydrophobization using HMDSO which is significantly faster than the processes known from the state of the art and generally milder temperatures are sufficient, for example in the range of from 60-80° C. The process of the present invention is applicable to different porous silica based compounds, for examples to silicates, alumino-silicates, calcium silicates, precipitated and fumed silica. Furthermore, using the process of the present invention it is generally possible to recycle HMDSO, which reduces the wastage of silicone raw material and solvent.

The process according to the present invention comprises steps (i) to (iii). According to step (i), a composition (I) comprising a porous silica based compound is provided. According to step (ii), the composition (I) is treated with a composition (II) comprising hexamethyldisiloxane or its hydrolyzed form, and according to step (iii), the treated silica based compound is removed. The process can also comprise further steps such as for example temperature treatments.

Composition (1) comprises a porous silica based compound. Composition (1) can also comprise further compounds, in particular solvents. Generally, various porous silica based compounds can be used in the process of the present invention, for examples to silicates, alumino-silicates, calcium silicates, precipitated and fumed silica.

According to a further embodiment, the present invention thus is directed to the process for the hydrophobization of a porous silica based compound as disclosed above, wherein the silica based compound is selected from the group consisting of silicates, alumino-silicates, calcium silicates, precipitated and fumed silica.

According to the present invention, it is possible to use the process for hydrophobization of a porous silica based compound as such. It is also possible to combine the process for hydrophobization according to the present invention with a preparation process for a porous silica based compound, for example a silica based aerogel.

According to a further embodiment, the present invention thus is directed to the process for the hydrophobization of a porous silica based compound as disclosed above, wherein the silica based compound is a silica based aerogel.

Suitable precursors for the gelation are known to the person skilled in the art. The invention is not limited by the nature or type of the precursor(s) used. The precursor(s) may be inorganic, organic or a combination of inorganic/organic hybrid materials. Suitable precursors that may be used for the silica aerogel production and hydrophobization are for example commercially available sodium silicate precursors such as for example a sodium metasilicate nonahydrate available under the trade name Formsil, silica hydrogels, for example KC Trockenperien or Sorbead WS hydrogel, a TEOS precursor, or fumed or precipitated silicas such as for example Aerosil or Sipemat.

In case a sodium silicate precursor is used, the process may comprise the steps of performing the gel step, solvent exchange, acidification, supercritical drying and hydrophobization.

In case a silica hydrogel precursor is used, the process may comprise the steps of performing the solvent exchange, acidification, supercritical drying and hydrophobization.

In case a TEOS precursor is used, the process may comprise the steps of performing the gel step, acidification, supercritical drying and hydrophobization.

Alternatively, the HMDSO can be hydrolyzed in the presence of an acid catalyst and co-solvent.

In case a fumed or precipitated silica precursor is used, the process may comprise the steps of performing the acidification, supercritical drying and hydrophobization.

According to a further embodiment, the present invention thus is directed to the process for the hydrophobization of a porous silica based compound as disclosed above, wherein the silica based aerogel is obtained from a sodium silicate precursor, a silica hydrogel, or a fumed or precipitated silica.

The process of the present invention can also comprise further steps, for example suitable treatment steps.

According to the present invention, it is also possible to combine treatment step (ii) with a further step of the preparation process of a porous silica based compound, such as for example a solvent exchange step prior to a drying step or a depressurization step in aerogel production. According to the present invention it is also possible to integrate the hydrophobization step into a continuous aerogel production process.

According to step (ii) of the process according to the present invention, the composition (I) is treated with a composition (II) comprising hexamethyldisiloxane or its hydrolyzed form. Composition (II) comprises at least hexamethyldisiloxane or its hydrolyzed form but can comprise further components such as for example solvents or additives.

In principle, any solvent can be used as long as it is miscible hexamethyldisiloxane or its hydrolyzed form, respectively, and has a sufficient boiling point which allows for removal of the solvent. Generally, the solvent will be a low molecular organic compound, i.e. an alcohol having 1 to 6 carbon atoms, preferably 2 to 4, although other liquids known in the art can be used. Possible solvents are, for example, ketones, aldehydes, alkyl alkanoates, amides such as formamide, N-methylpyrollidone, N-ethylpyrollidone, sulfoxides such as dimethyl sulfoxide, aliphatic and cycloaliphatic halogenated hydrocarbons, halogenated aromatic compounds and fluorine-containing ethers. Mixtures of two or more of the abovementioned compounds are likewise possible. Examples of other useful liquids include but are not limited to: ethyl acetate, ethyl acetoacetate, acetone, dichloromethane, iso-propanol, methylethylketone, tetrahydrofurane, propyl-enecarbonate, and the like.

Further possibilities of solvents are acetals, in particular diethoxymethane, dimethoxymethane and 1,3-dioxolane.

Dialkyl ethers and cyclic ethers are likewise suitable as solvent. Preferred dialkyl ethers are, in particular, those having from 2 to 6 carbon atoms, in particular methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and ethyl t-butyl ether. Preferred cyclic ethers are, in particular, tetrahydrofuran, dioxane and tetrahydropyran.

Aldehydes and/or ketones are particularly preferred as solvent Aldehydes or ketones suitable as solvent are, in particular, those corresponding to the general formula R2-(CO)—R1, where R1 and R2 are each hydrogen or an alkyl group having 1, 2, 3, 4, 5, 6 or 7 carbon atoms. Suitable aldehydes or ketones are, in particular, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanoacetaldehyde, ethyl glyoxylate, benzaldehyde, acetone, diethyl ketone, methyl ethyl ketone, methyl isobutyl ketone, methyl n-butyl ketone, methyl pentylketone, dipropyl ketone, ethyl isopropyl ketone, ethyl butyl ketone, diisobutylketone, 5-methyl-2-acetyl furan, 2-acetylfuran, 2-methoxy-4-methylpentan-2-one, 5-methylheptan-3-one, 2-heptanone, octanone, cyclohexanone, cyclopentanone, and acetophenone. The abovementioned aldehydes and ketones can also be used in the form of mixtures. Ketones and aldehydes having alkyl groups having up to 3 carbon atoms per substituent are preferred as solvent.

Further preferred solvents are alkyl alkanoates, in particular methyl formate, methyl acetate, ethyl formate, isopropyl acetate, butyl acetate, ethyl acetate, glycerine triacetate and ethyl acetoacetate. Preferred halogenated solvents are described in WO 00/24799, page 4, line 12 to page 5, line 4.

Further suitable solvents are organic carbonates such as for example dimethyl carbonate, diethyl carbonate, ethylene carbonate, propylene carbonate or butylene carbonate.

In many cases, particularly suitable solvents are obtained by using two or more completely miscible compounds selected from the abovementioned solvents.

Particularly suitable solvents may for example be alcohols or mixtures of alcohols and water. Suitable alcohols are for example methanol, ethanol, propanol or butanol. The water can be in the form of a dilute acid such as sulfuric acid.

According to a further embodiment, the present invention thus is directed to the process for the hydrophobization of a porous silica based compound as disclosed above, wherein composition (II) comprises hexamethyldisiloxane or its hydrolyzed form and an alcohol.

According to a further embodiment, the present invention thus is directed to the process for the hydrophobization of a porous silica based compound as disclosed above, wherein composition (II) comprises hexamethyldisiloxane or its hydrolyzed form, ethanol and optionally water.

According to a further embodiment, the present invention thus is directed to the process for the hydrophobization of a porous silica based compound as disclosed above, wherein composition (II) comprises hexamethyldisiloxane or its hydrolyzed form, ethanol and optionally dilute sulfuric acid.

The conditions for the treatment step (ii) can vary in wide ranges. Preferably step (ii) is carried out at a temperature in the range of from 60 to 90° C., more preferably in the range of from 60 to 80° C. Therefore, according to a further embodiment, the present invention thus is directed to the process for the hydrophobization of a porous silica based compound as disclosed above, wherein the treatment according to step (ii) is carried out at a temperature in the range of from 60 to 90° C.

Preferably, the pH value for the treatment step (ii) is adjusted in a range of from 0.5 to 3, more preferable in the range of from 1 to 2.

According to a further embodiment, the present invention thus is directed to the process for the hydrophobization of a porous silica based compound as disclosed above, wherein the treatment according to step (ii) is carried out at a pH value in the range of from 0.5 to 3.

The process of the present invention further comprises step (iii). According to step (iii), the treated silica based compound is removed. Removal can be carried out using any suitable technique.

The process of the present invention may also comprise further drying steps.

The product obtained in the process of the present invention generally is a micrometer-sized powder of porous silica based compound, preferably an aerogel with a porosity of at least 70 vol. %, in particular a silica based aerogel.

In the context of the present invention, the surface area, the pore sizes as well as the pore volumes were measured by BET in accordance with ISO 9277:2010 unless otherwise noted. This International Standard specifies the determination of the overall specific external and internal surface area of disperse (e.g. nano-powders) or porous solids by measuring the amount of physically adsorbed gas according to the Brunauer, Emmett and Teller (BET) method. It takes account of the International Union for Pure and Applied Chemistry (IUPAC) recommendations of 1984 and 1994.

The hydrophobic properties of the porous silica based compound obtained according to the present invention can for example be determined using the contact angle.

According to a further aspect, the present invention is also directed to a porous silica based compound obtained or obtainable by a process as disclosed above.

According to a further embodiment, the present invention thus is directed to the porous silica based compound as disclosed above, wherein the silica based compound is a silica based aerogel.

The inorganic aerogels obtained or obtainable by the process of the present invention are suitable for different applications such as for medical and pharmaceutical applications, as adsorbents, for cosmetic applications, as additive for food, as catalyst support, for the preparation of sensors, or for thermal insulation. Therefore, according to a further aspect, the present invention is also directed to the use of a porous silica based compound according as disclosed above or a porous silica based compound obtained or obtainable by a process as disclosed above for medical and pharmaceutical applications, as adsorbents, for cosmetic applications, as additive for food, as catalyst support, for the preparation of sensors, or for thermal insulation.

The present invention is also directed to the use of porous materials as disclosed above or a porous material obtained or obtainable according to a process as disclosed above as thermal insulation material or as core material for vacuum insulation panels.

The invention also relates to construction materials and vacuum insulation panels comprising the powder form nanoporous materials and the use of powder form nanoporous materials for thermal insulation. Preferably, the materials obtained according to the invention are used for thermal insulation especially in buildings, or for cold insulation, particularly in mobile, transportation applications or in stationary applications, for example in cooling devices or for mobile applications.

For mechanical reinforcement fibers can be used as additives. These fibers may be of inorganic or organic origin. Examples of inorganic fibers are glass wool, rock wool, basalt fibers, slag wool, ceramic fibers made from molten aluminum and/or silica and other inorganic metal oxides, and also pure silica fibers. Organic fibers are, for example, cellulose fibers, textile fibers or plastic fibers. Diameters are preferably in the range of 1 to 12 microns, and 6 to 9 microns in particular. The length might preferably be in the range of 1 to 25 mm, 3 to 10 mm in particular.

For technical and economic reasons, a mixture of inorganic fillers may be added. In the context of the present invention, synthetic modifications of silica, like precipitated silicas, arc silicas, $SiO_2$-containing fly ash, resulting from oxidation of volatile silicon monoxide, in the electrochemical production of silicon or ferrosilicon might be used. As silicas which are produced by leaching of silicates such as calcium silicate, magnesium silicate, and mixed silicates, like olivine (magnesium iron silicate) prepared using acids might be used. Also suitable for use are naturally occurring $SiO_2$-containing compounds such as diatomaceous earth. Also thermally bloated perlite and vermiculite minerals can be used. Depending on requirements, preferably finely divided metal oxides such as, preferably, alumina, titanium dioxide, iron oxide can be added.

After completion of the mixing process the tap density of the mixture, depending on the type and amount of the components, preferably is between 40 to 180 $kg/m^3$, more preferably 40 to 90 $kg/m^3$, respectively. The flowability of the resulting porous mixture is very good, so that they can easily and homogeneously be pressed into plates or can be filled into the cavities of hollow blocks. When pressing to sheets it is possible to influence the properties of the plate like plate thicknesses, the weight, density, and consequently the thermal conductivity of the insulating material. The lower the density of the plates, the better are the insulation properties.

The materials used in thermal insulation materials are preferably used in the following fields of application: as insulation in hollow blocks, as core insulation for multi-shell building blocks, as core insulation for vacuum insulation panels (VIP), as the core insulation for exterior insulation systems, as insulation for cavity wall works, especially in the context of loose-fill insulation.

A further object of the present invention are molded articles, building blocks or modules, building systems and building composites which contain or consist of the powdery material according to the present invention. Another object of the present invention are vacuum insulation panels which contain powdery nanoporous materials according to the present invention. Furthermore, the thermal insulation material and the powdery nanoporous materials are in particular suitable for the insulation of extruded hollow profiles, particularly as the core material for the insulation in window frames.

The thermal insulation material is for example an insulation material which is used for insulation in the interior or the exterior of a building or as wall cavity insulation. The porous material according to the present invention can advantageously be used in thermal insulation systems such as for example composite materials. The powdery materials according to the present invention are for example suitable as core material for vacuum insulation panels which are used for insulation in transportation applications. They might be used as interior lining with advantageous insulating properties, for example as interior lining for vehicles. It has been found advantageous to use powdery materials since the respective parts for transportation applications, for example for vehicle construction might have complex shapes.

The powdery materials according to the present invention can for example be used as insulating materials as core material in hollow components, for example in hollow blocks.

Hollow components in the context of the present invention are components which have one or more cavities. They might be prepared from inorganic ceramic materials, such as burnt clay (brick), concrete, glass, gypsum, and natural products such as natural stone, such as limestone exist. Preferably, hollow blocks made of brick, concrete and lightweight concrete are used. Further embodiments are for example wall blocks, floor tiles, ceiling panels and stem elements.

It is known that the cavities of these elements may be filled with insulation materials such as Perlite foam or polystyrene foam. These components are referred to as hollow blocks with integrated thermal insulation.

The use of hollow blocks with integrated thermal insulation to ensure a particularly high thermal insulation also the heat storage should be favored. The inventive use of the porous heat insulating materials described in hollow blocks, the thermal properties of these stones are significantly improved and sustained at a high level. Furthermore, heat insulation plates can be size-swaged and integrated into the chambers of the hollow blocks. Alternatively, plates can be dimensionally accurate cut out from large sheets previously prepared and incorporated into the modules.

To ensure a good balance of the insulation properties obtained and economic factors, combinations of the porous materials according to the invention and conventional insulating materials might be used. Furthermore, it is possible according to the invention to fill the cavities of the hollow components only partly.

According to a further aspect, the present invention is also directed to the use of porous silica based compound as disclosed above as catalyst support, for the preparation of sensors as additive for food applications or for medical, pharmaceutical and cosmetic applications. Within cosmetic applications the inorganic aerogels obtained or obtainable by the process of the present invention can be used for example as deodorant active agent which is one method for the treatment of human body odors. These can be provided in all forms which can be envisaged for a deodorant composition. It can be a lotion, dispersion as a spray or aerosol; a cream, in particular dispensed as a tube or as a grating; a fluid gel, dispensed as a roll-an or as a grating; in the form of a stick; in the form of a loose or compact powder, and comprising, in this respect, the ingredients generally used in products of this type which are well known to a person skilled in the art, with the proviso that they do not interfere with the aerogels in accordance with the invention.

The concentrations of hydrophobic aerogel to be used in the deodorant compositions depend in particular on the formulation form of the composition. Thus, the concentration of hydrophobic aerogel in a composition can vary from 0.1 to 80% by weight, with respect to the total weight of the composition, for example from 0.1% by weight, in the case of a formulation in the aerosol form, to 80% by weight, in the case of a loose powder. Non-silica based inorganic aerogels are being formed via an analogous mechanism from the corresponding oxides or alkoxides as silica based aerogels.

The present invention includes the following embodiments, wherein these include the specific combinations of embodiments as indicated by the respective interdependencies defined therein.

1. Process for the hydrophobization of a porous silica based compound, the process comprising the steps
   (i) providing a composition (I) comprising a porous silica based compound,
   (ii) treating the composition (I) with a composition (II) comprising hexamethyldisiloxane or its hydrolyzed form,
   (iii) removing the treated silica based compound.
2. The process according to embodiment 1, wherein the silica based compound is selected from the group consisting of silicates, alumino-silicates, calcium silicates, precipitated and fumed silica.
3. The process according to embodiment 1 or 2, wherein the silica based compound is a silica based aerogel.
4. The process according to embodiment 3, wherein the silica based aerogel is obtained from a sodium silicate precursor, a silica hydrogel, or a fumed or precipitated silica.
5. The process according to any one of embodiments 1 to 4, wherein composition (II) comprises hexamethyldisiloxane and an alcohol.
6. The process according to any one of embodiments 1 to 5, wherein composition (II) comprises hexamethyldisiloxane, ethanol and optionally water.
7. The process according to any one of embodiments 1 to 6, wherein composition (II) comprises hexamethyldisiloxane, ethanol and optionally dilute acid.
8. The process according to any one of embodiments 1 to 7, wherein the treatment according to step (ii) is carried out at a temperature in the range of from 60 to 90° C.
9. The process according to any one of embodiments 1 to 8, wherein the treatment according to step (ii) is carried out at a pH value in the range of from 0.5 to 3.
10. A porous silica based compound obtained or obtainable by a process according to any one of embodiments 1 to 9.
11. A porous silica based compound obtained or obtainable by a process for the hydrophobization of a porous silica based compound, the process comprising the steps
    (i) providing a composition (I) comprising a porous silica based compound,
    (ii) treating the composition (I) with a composition (II) comprising hexamethyldisiloxane or its hydrolyzed form,
    (iii) removing the treated silica based compound.
12. The porous silica based compound according to embodiment 11, wherein the silica based compound is selected from the group consisting of silicates, alumino-silicates, calcium silicates, precipitated and fumed silica.
13. The porous silica based compound according to embodiment 1 or 2, wherein the silica based compound is a silica based aerogel.
14. The porous silica based compound according to embodiment 3, wherein the silica based aerogel is obtained from a sodium silicate precursor, a silica hydrogel, or a fumed or precipitated silica.

15. The porous silica based compound according to any one of embodiments 1 to 4, wherein composition (II) comprises hexamethyldisiloxane and an alcohol.
16. The porous silica based compound according to any one of embodiments 1 to 5, wherein composition (II) comprises hexamethyldisiloxane, ethanol and optionally water.
17. The porous silica based compound according to any one of embodiments 1 to 6, wherein composition (II) comprises hexamethyldisiloxane, ethanol and optionally dilute acid.
18. The porous silica based compound according to any one of embodiments 1 to 7, wherein the treatment according to step (ii) is carried out at a temperature in the range of from 60 to 90° C.
19. The porous silica based compound according to any one of embodiments 1 to 8, wherein the treatment according to step (ii) is carried out at a pH value in the range of from 0.5 to 3.
20. The porous silica based compound according to embodiment 10, wherein the silica based compound is a silica based aerogel.
21. Use of porous silica based compound according to any one of embodiments 10 to 20 or a porous silica based compound obtained or obtainable by a process according to any of embodiments 1 to 9 for medical and pharmaceutical applications, as adsorbents, for cosmetic applications, as additive for food, as catalyst support, for the preparation of sensors, or for thermal insulation.
22. Process for the hydrophobization of a porous silica based compound, the process comprising the steps
    (i) providing a composition (I) comprising a porous silica based compound,
    (ii) treating the composition (I) with a composition (II) comprising hexamethyldisiloxane,
    (iii) removing the treated silica based compound.
23. The process according to embodiment 22, wherein the silica based compound is selected from the group consisting of silicates, alumino-silicates, calcium silicates, precipitated and fumed silica.
24. The process according to embodiment 22 or 23, wherein the silica based compound is a silica based aerogel.
25. The process according to embodiment 24, wherein the silica based aerogel is obtained from a sodium silicate precursor, a silica hydrogel, or a fumed or precipitated silica.
26. The process according to any one of embodiments 22 to 25, wherein composition (II) comprises hexamethyldisiloxane and an alcohol.
27. The process according to any one of embodiments 22 to 26, wherein composition (II) comprises hexamethyldisiloxane, ethanol and optionally water.
28. The process according to any one of embodiments 22 to 27, wherein composition (II) comprises hexamethyldisiloxane, ethanol and optionally dilute acid.
29. The process according to any one of embodiments 22 to 28, wherein the treatment according to step (ii) is carried out at a temperature in the range of from 60 to 90° C.
30. The process according to any one of embodiments 22 to 29, wherein the treatment according to step (ii) is carried out at a pH value in the range of from 0.5 to 3.

EXAMPLES

The preparation methodology for above possibilities is given below.

1. Preparation Examples 1.1 Hydrophobic Silica (Aerogel) from Sodium Silicate Precursor (Formsil)

Solution 1: 250 g Formsil (Sodium metasilicate nonahydrate; CAS Number 13517-24-3; Mwt: 284) powder was mixed with 250 g deionized water and stirred for 2 h at 50° C. until a clear solution was obtained.

Solution 2: 200 g (32 wt %) HCl was added to 1800 g water and stirred at room temperature.

1.1.1 497.5 g of solution 1 was added to solution 2000 g of solution 2. The solution solidified into a soft gel in less than 30 seconds. The pH was measured to be 6.8. The total mass of the soft gel was 2497.5 g.

(Silica aerogel density adjustments can be made by adjusting the water amount)

The soft gel was mechanically crushed and filtered through a 125 μm sieve. The residual mass of the gel (>125 μm) was determined to be 1659 g.

The gel mass was solvent exchanged with recycled ethanol (93%) and pH was measured to be between 6.65-9.06 (4 separate experiments).

The last solvent exchange was performed with 100% fresh ethanol (final solvent concentration 94-98%)

HCl (32%) was added to the alcogel (solution+gel) system until a pH of 0.96 (glass electrode) was reached. This translated to 0.7 wt % HCl (32%) in ethanol or 0.22 wt % HCl (absolute) in ethanol.

This methodology should also work for TEOS based silica alcogels. Acidify the TEOS (CAS number: 78-10-4) gel with HCl to pH 1.0 before supercritical drying The acidified alcogel was dried at 60° C., 120 bar, 1 h to get an acidified hydrophilic aerogel.

Surface area: 986 m$^2$/g
Pore volume: 5.42 cm$^3$/g
Bulk density: 0.058 g/cm$^3$
Contact angle: 0°

1.1.2 2 g acidified hydrophilic aerogel was packed in a filter and place in a closed vessel at 80° C. 5 g HMDSO was added to the vessel. After 30 min the aerogel was removed and observed to be hydrophobic (floats on water).

Surface area: 690 m$^2$/g
Pore volume: 4.36 cm$^3$/g
Bulk density: 0.063 g/cm$^3$
Contact angle: 149.5°

1.2 Hydrophobic Silica (Aerogel) from Commercial Hydrogels (Example Wet KC-Trockenperlen Beads)

KC Trockenperlen Hydrogel (CAS Number 1327-36-2) (BASF) with a pH of 4 was solvent exchanged with ethanol (final solvent concentration 94-98%).

1.2.1 Step A

The alcogel was dried at 60° C., 120 bar, 1 h to get a hydrophilic aerogel.

Surface area: 862 m$^2$/g
Pore volume: 4.92 cm$^3$/g
Bulk density (crushed): 0.113 g/cm$^3$
Contact angle: 72°

1.2.2 Step B 5.2 g of above hydrophilic aerogel was packed in a filter and place in a closed vessel (250 ml) at 80° C. 13.4 g HMDSO+2.3 g ethanol+0.3 g water mixture was added to the vessel. After 30 min the aerogel was removed and observed to be hydrophobic.
Surface area: 647 m$^2$/g
Pore volume: 4.0 cm$^3$/g
Bulk density: 0.123 g/cm$^3$
Contact angle: 141.5°

1.2.3 Hydrophobization Variations:

Step B1: 4.3 g of aerogel from example 1.2 Step A was evacuated and afterwards packed in a filter and place in a closed vessel (250 ml) at 80° C. 11.07 g HMDSO added to the vessel. After 90 min the aerogel was removed and observed to be hydrophobic.
Surface area: 592 m$^2$/g
Pore volume: 2.56 cm$^3$/g
Contact angle: 138.8°

Step B2: 4.61 g of aerogel from example 1.2 Step A was evacuated and afterwards packed in a filter and place in a closed vessel (250 ml) at 80° C. 22.9 g of recycled HMDSO/ethanol/water mixture was added to the vessel. After 90 min the aerogel was removed and observed to be hydrophobic.
Contact angle: 148.7°

1.3 Hydrophobizing Commercial Precipitated and Fumed Silica (Example Sipemat 2200)

1.3.1 The surface area of commercial silica (Sipemat 2200, CAS number 112926-00-8 or CAS number 7631-86-9) was measured as follows
Surface area: 168 m$^2$/g
Pore volume: 1.6 cm$^3$/g
Bulk density: 0.211 g/cm$^3$
Contact angle: 5°

1.3.2 This Sipernat 2200 precipitated silica was dispersed in 100% ethanol and HCl (32%) was added (alcogel solution pH<0.1). The acidified alcogel was dried at 60° C., 120 bar, 1 h to get an acidified hydrophilic aerogel
Surface area: 214 m$^2$/g
Pore volume: 1.3 cm$^3$/g
Bulk density: 0.311 g/cm$^3$
Contact angle: 5°

1.3.3 2 g acidified hydrophilic aerogel was packed in a filter and place in a closed vessel at 80° C. 5 g HMDSO was added to the vessel. After 30 min the aerogel was removed and observed to be hydrophobic (floats on water).
Surface area: 181 m$^2$/g
Pore volume: 1.39 cm$^3$/g
Bulk density: 0.262 g/cm$^3$
Contact angle: 144°
Fumed silica (Aerosil, CAS number 112945-52-5) could also be hydrophobized 1.4 Hydrophobic Silica (Aerogel) from Sodium Silicate Precursor (Formsil)

Solution 1: 300 g Formsil (Sodium metasilicate nonahydrate; CAS Number 13517-24-3; Mwt 284) powder was mixed with 750 g deionized water and stirred for 2 h at 50° C. until a clear solution was obtained.
The solution was sprayed into supercritical CO2 at 60° C. and 80 bar. After spraying the solution, the autoclave system was depressurized and silica hydrogel was obtained. The pH of the system was between 7.0-9.5. Silica aerogel density adjustments can be made by adjusting the water amount.
The gel mass was solvent exchanged with recycled ethanol (93%) and pH was measured to be between 6.9-8.5.
The last solvent exchange was performed with 100% fresh ethanol (final solvent concentration 94-98%)
The alcogel was dried at 60° C., 120 bar, 1 h to get an hydrophilic aerogel
Surface area: 719 m$^2$/g
Pore volume: 6.16 cm$^3$/g
Bulk density: 0.040 g/cm$^3$
Contact angle: 0°
2 g hydrophilic aerogel was packed in a filter and place in a closed vessel at 80° C. 5 g hydrolyzed HMDSO or trimethylsilanol (TMS) was added to the vessel. After 30 min, the aerogel was removed and observed to be hydrophobic (floats on water).
Surface area: 624 m$^2$/g
Pore volume: 4.98 cm$^3$/g
Bulk density: 0.058 g/cm$^3$
Contact angle: 142°

LITERATURE CITED

WO 2012/041823 A1
WO 00/24799 A1

The invention claimed is:

1. A process for the hydrophobization of a porous silica-based compound, the process comprising:
   (i) providing a composition (I) comprising a porous silica-based compound,
   (ii) treating the composition (I) in a treatment vessel with a composition (II) comprising hexamethyldisiloxane or its hydrolyzed form, to obtain a treated porous silica-based compound, and
   (iii) removing the treated porous silica-based compound from the treatment vessel,
   wherein the treatment according to (ii) is carried out at a temperature in the range of from 60 to 90° C. and at a pH value in the range of from 0.5 to 3,
   and wherein the porous silica-based compound is a silica-based aerogel.

2. The process according to claim 1, wherein the porous silica-based compound is selected from the group consisting of a silicate, an alumino-silicate, a calcium silicate, precipitated silica, and fumed silica.

3. The process according to claim 1, wherein the silica-based compound is obtained from a sodium silicate precursor, a silica hydrogel, a fumed silica, or a precipitated silica.

4. The process according to claim 1, wherein the composition (II) comprises hexamethyldisiloxane and an alcohol.

5. The process according to claim 1, wherein the composition (II) comprises hexamethyldisiloxane, ethanol, and optionally, water.

6. The process according to claim 1, wherein the composition (II) comprises hexamethyldisiloxane, ethanol, and optionally, dilute acid.

7. The process of claim 1, wherein the porous silica-based compound is an aerogel, and wherein providing the composition (I) comprising the porous silica-based compound comprises providing a gel and drying the gel under supercritical conditions.

8. The process of claim 1, wherein the porous silica-based compound is an aerogel, and wherein providing the composition (I) comprising the porous silica-based compound comprises providing a gel, acidifying the gel, and drying the gel under supercritical conditions.

9. The process of claim 1, wherein the treated porous silica-based compound has a contact angle of from 138.8° to 149.5°.

10. The process of claim 1, wherein, before (ii) treating the composition (I) in a treatment vessel, the porous silica-based compound is a hydrophilic compound having a contact angle of from 0° to 72°.

\* \* \* \* \*